United States Patent [19]

Kershaw et al.

[11] 3,938,238

[45] Feb. 17, 1976

[54] METHOD FOR MAKING A MODULAR TRUCK BODY

[75] Inventors: Samuel L. Kershaw; Bernard E. Proeschl, both of Decatur, Ill.

[73] Assignee: Caterpillar Tractor Co., Peoria, Ill.

[22] Filed: Nov. 18, 1974

[21] Appl. No.: 524,994

Related U.S. Application Data

[62] Division of Ser. No. 472,709, May 23, 1974.

[52] U.S. Cl. ................................ 29/469; 29/464
[51] Int. Cl.² ........................................... B23P 21/00
[58] Field of Search ............. 29/469, 464, 428, 429, 29/430, 431; 296/28 M, 28 D, 28 K, 36; 298/9, 10, 17 R; 52/584, 582, 279

[56] References Cited
UNITED STATES PATENTS

| | | | |
|---|---|---|---|
| 2,000,847 | 5/1935 | Kehm | 52/584 |
| 2,268,636 | 1/1942 | Becker | 52/582 |
| 2,489,670 | 11/1949 | Powell | 296/28 M |
| 2,600,140 | 6/1952 | Torseth | 296/28 M |
| 3,188,131 | 6/1965 | Attwood | 52/270 |
| 3,462,187 | 8/1969 | Hassler | 296/28 D |
| 3,762,113 | 10/1973 | O'Mullan et al. | 52/582 |

*Primary Examiner*—C. W. Lanham
*Assistant Examiner*—James R. Duzan
*Attorney, Agent, or Firm*—Phillips, Moore, Weissenberger Lempio & Strabala

[57] ABSTRACT

A modular truck body comprises a pair of upstanding side modules each having an L-shaped cross section, a bottom module having its outer edges secured to inner edges of the side modules and an upstanding front module secured between the side modules and having its lower edge secured to the bottom module. The modules are aligned and pre-assembled at a manufacturing plant and then disassembled for shipping purposes. At a customer's job site or the like the modules are re-assembled and secured together for installation on the frame of a truck.

6 Claims, 7 Drawing Figures

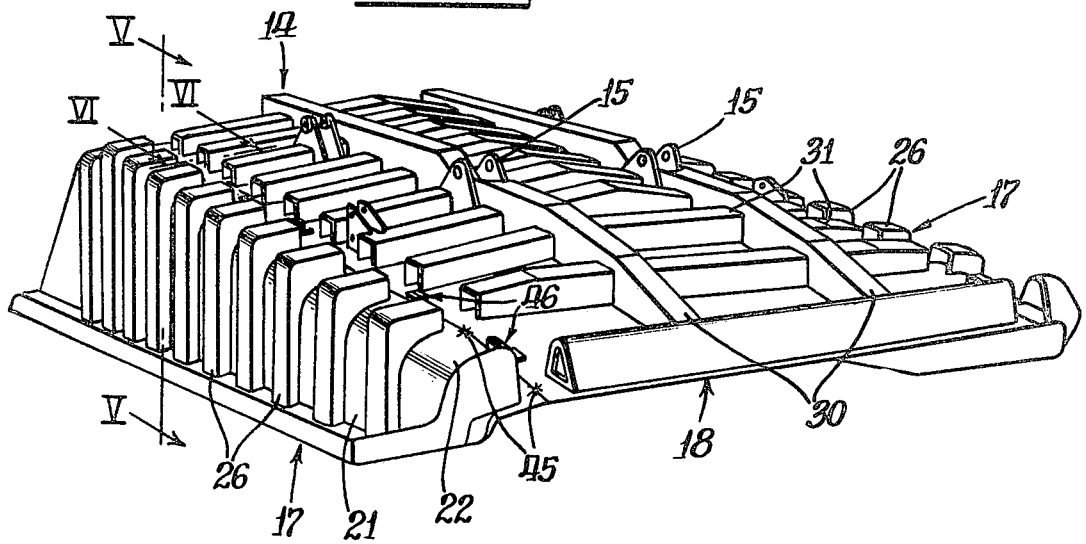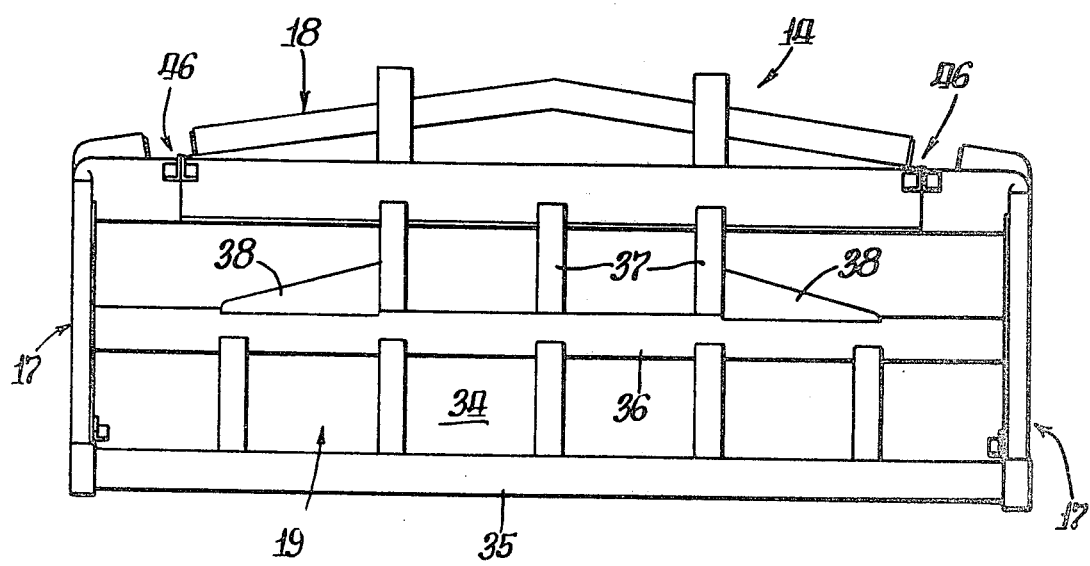

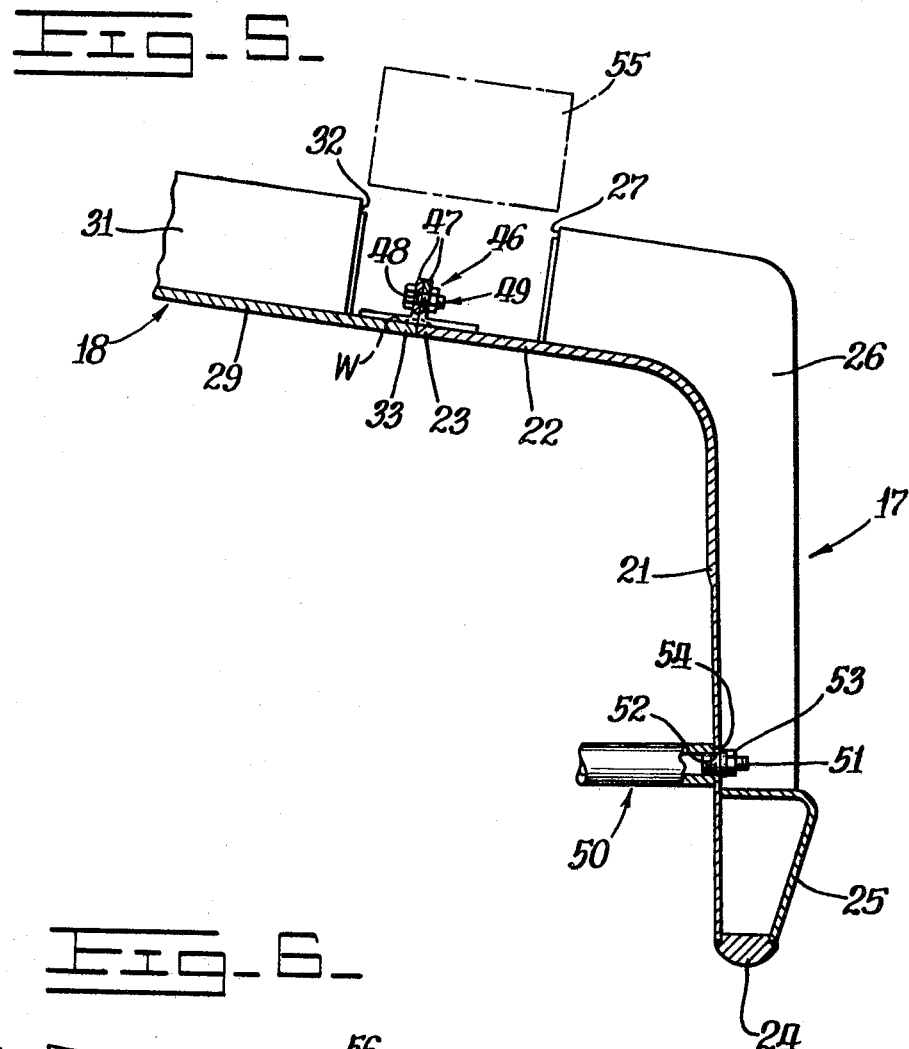
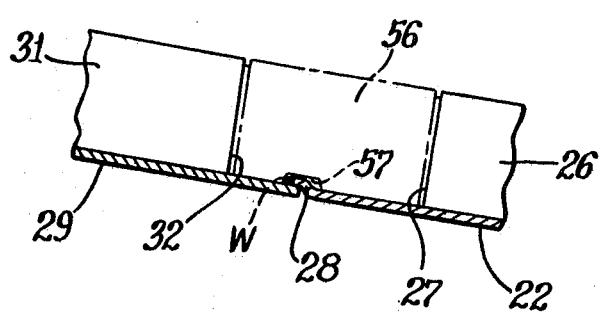

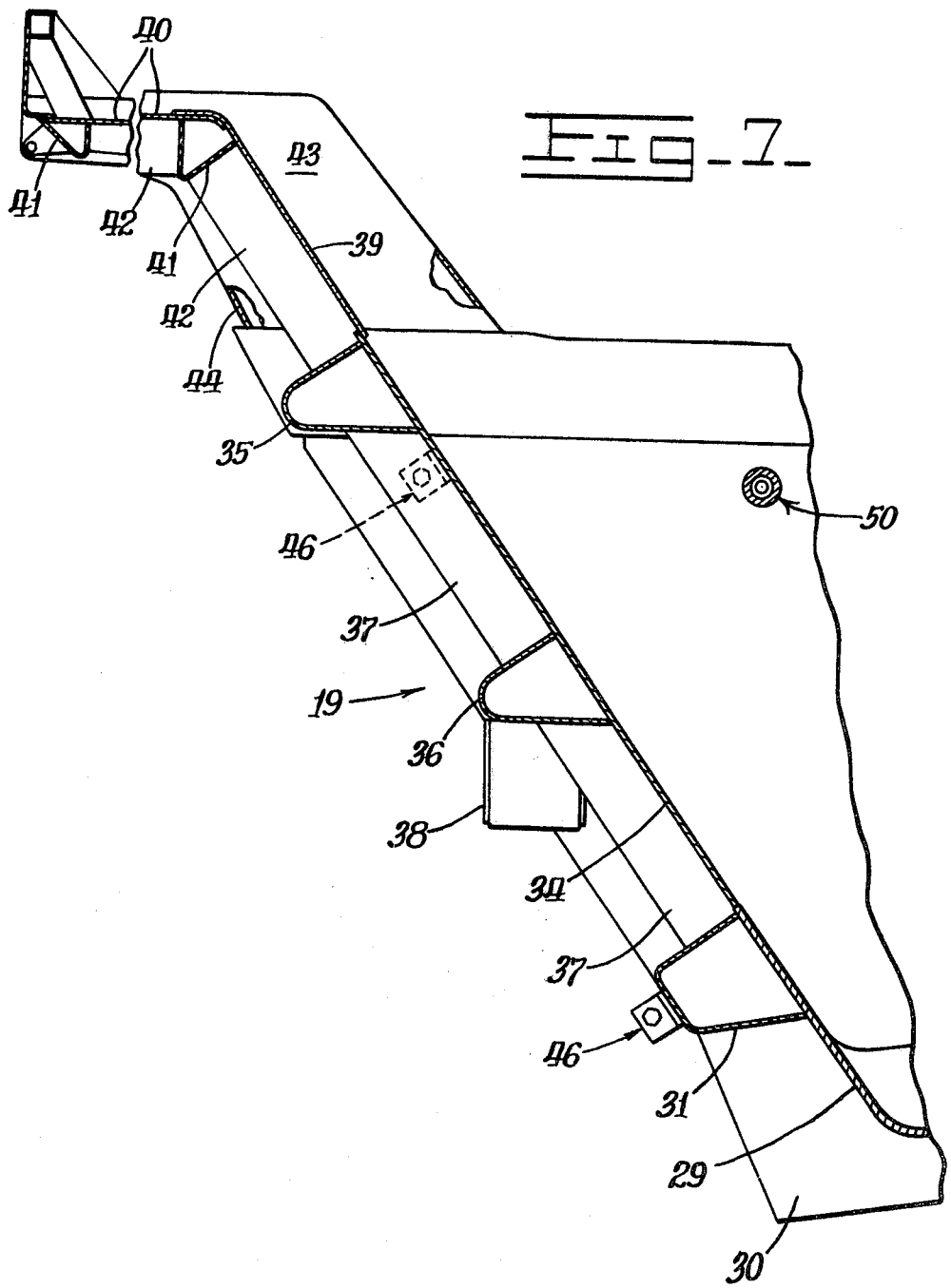

METHOD FOR MAKING A MODULAR TRUCK BODY

This is a division, of Ser. No. 472,709, filed May 23, 1974.

BACKGROUND OF THE INVENTION

The ever increasing size of on and off-highway trucks has given rise to shipping problems; namely, various regulations which dictate the maximum size of a truck and components thereof which may be shipped on commercial carriers. Therefore, truck bodies and the like are normally broken-down into their component parts to comply with such regulations and to also substantially decrease composite shipping volumes and shipping costs. In conventional practice, the truck body is normally completed at a manufacturing facility by securing the various plates and beam members thereof together by standard welding processes.

The completed truck body is then cut into several sections at the various welds for shipping purposes. The re-assembly and fabrication of the component parts at a customer's job site requires complex fixtures and methods for applying high quality welds over the welded joints which have been severed previously. In addition to the laborious and time-consuming nature of such a procedure, the resulting welds are sometimes found defective to thus impair the structural integrity of the completed truck body.

SUMMARY OF THE INVENTION

An object of this invention is to overcome the above, briefly described problems by providing an economical and non-complex modular truck body which exhibits a high degree of structural integrity and a method of making the same expeditiously. The truck body comprises a pair of upstanding and laterally spaced side modules of L-shaped cross section, a bottom module having its outer ends secured to inner ends of the side modules and an upstanding front module secured between the side modules and having its lower end secured to the bottom module. The modules are pre-assembled at a manufacturing facility and temporarily attached together. The modules are then disassembled and shipped to a job site whereat alignment means, employed during the pre-assembly operation, are utilized to precisely attach the modules together for final assembly purposes.

BRIEF DESCRIPTION OF THE DRAWINGS

Other objects of this invention will become apparent from the following description and accompanying drawings wherein:

FIG. 3 is an isometric view of the truck body, showing it in an inverted position during pre-assembly thereof;

FIG. 4 is a front elevational view of the FIG. 3 truck body;

FIG. 5 is an enlarged sectional view of a front portion of the truck body, taken in the direction of arrows V—V in FIG. 3;

FIG. 6 is an enlarged sectional view, taken in the direction of arrows VI—VI in FIG. 3; and FIG. 7 is an enlarged sectional view of a front portion of the completed truck body of FIG. 1.

DETAILED DESCRIPTION

Figure 1:
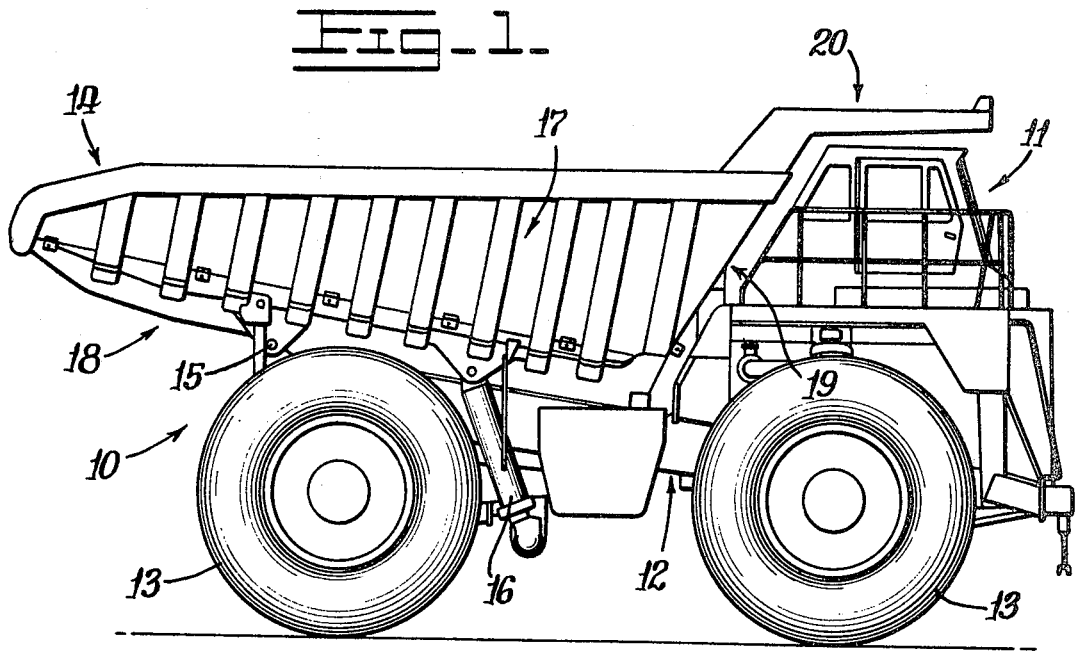
FIG. 1 is a side elevational view of an off-highway truck employing the modular truck body of this invention thereon.

FIG. 1 discloses an off-highway truck 10 comprising an operator's station or cab 11, a main frame 12 and a plurality of roadwheels 13 rotatably mounted on the frame in a conventional manner. A modular truck body 14 of this invention is pivotally mounted at its rearward end on the frame by a pair of laterally spaced pivot means 15 (one shown). A pair of double-acting hydraulic cylinders 16 (one shown) are pivotally interconnected between the frame and the truck body to selectively tilt the truck body rearwardly about pivot means 15 for dumping purposes.

Figure 2:
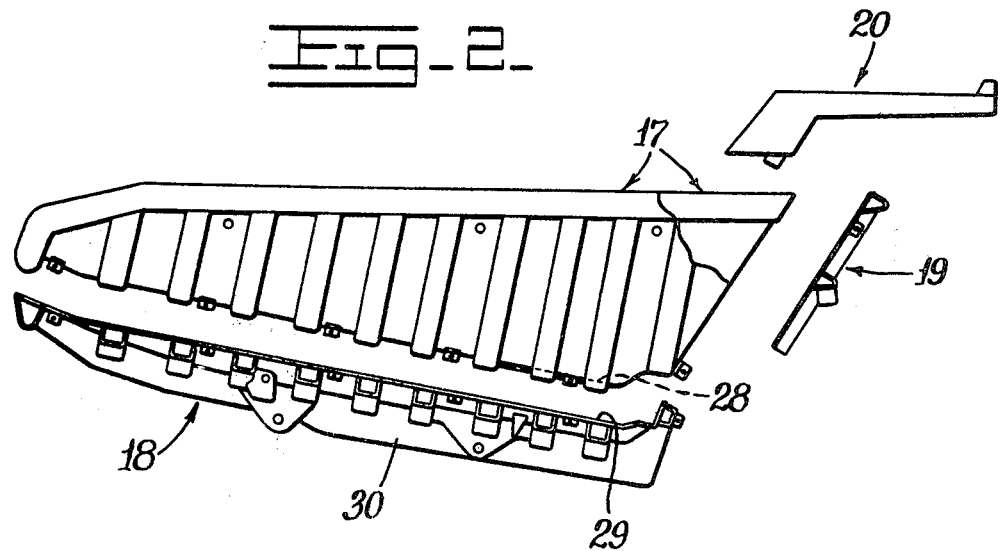
FIG. 2 is an exploded, side elevational view of the truck body.

Referring to FIG. 2, the truck body essentially comprises a pair of laterally spaced side modules 17, a generally horizontal floor module 18 and an upstanding front module 19. In addition, a canopy module 20 is preferably secured on a forward end of the truck body to overlie and protect operator's station 11 (FIG. 1). As will be hereinafter more fully described, the FIG. 2 truck body is adapted to undergo a pre-assembly operation at a manufacturing facility and subsequent disassembly and shipment to a customer's job site whereat the final assembly thereof is effected.

Referring to FIGS. 3–6, such pre-assembly is is preferably conducted when the truck body is inverted. The prefabricated modules are positioned as shown in FIG. 3 by suitably arranged jigs and fixtures. Each side module has an L-shaped cross section to comprise a generally vertical side plate or section 21 and a generally horizontal bottom plate or section 22 terminating at an inner end 23 thereof (FIG. 5).

Each side module terminates at its upper end at an elongated rail 24 secured at one side to an upper edge of plate 21 and at its other side to one leg of an L-shaped bracing plate 25. A plurality of longitudinally spaced L-shaped ribs 26, having a decreasingly shorter vertical height towards a rearward end of the truck body, are secured to side and bottom plates 21 and 22 and beneath bracing plate 25. The inner ends of the ribs have a U-shaped recess 27 formed thereon and outwardly from end 23 for purposes hereinafter explained.

As shown in FIGS. 2 and 6, a flange 28 is formed at the inner, forward end of plate 22 to overlap a plate 29 of floor module 18. The floor module further comprises a pair of parallel beams 30 and a plurality of longitudinally spaced and transversely disposed beams 31 of U-shaped cross section, all secured on plate 29. Beams 31 are interrupted by beams 30 and are each aligned with an end of a respective pair of ribs 26.

Referring to FIG. 5, the inner end of each beam 31 has a U-shaped recess 32 formed thereon. The recess substantially conforms to the shape of recess 27 and is longitudinally aligned therewith. In addition, recess 32 terminates short of an outer end 33 of bottom plate 29.

Referring to FIGS. 4 and 7, prefabricated front module 19 comprises an inclined plate 34 having an upper rail 35 secured thereon. A laterally extending intermediate rail 36 is also secured thereon along with a plurality of vertically disposed bracing beams 37 of U-shaped cross section. The front module further comprises a pair of laterally spaced and inclined box-like support structures 38 secured between plate 34, rail 36 and a respective beam 37.

Canopy module 20 (FIGS. 2 and 7) comprises a pair of overlapping main plates 39 and 40 having a plurality of transversely disposed beams 41 secured in underlying relationship thereon. A plurality of beams 42 are secured to beams 41 in transverse relationship therewith. A pair of laterally spaced L-shaped plates 43 are secured to the outer edges of a conforming outer wall 44 to provide a box-like sidewall at the forward, upper end of each side of the truck body.

PRE-ASSEMBLY OPERATION

FIG. 3 illustrates the truck body after it has undergone a pre-assembly operation, prior to disassembly and shipping thereof to a customer's job site. In particular, the side, bottom and front modules are pre-aligned at a manufacturing facility to facilitate expeditious final assembly thereof at such job site.

Suitable jigs and fixtures are employed to retain the modules in their FIG. 3 position wherein they may be tack welded together, as indicated by tack welds 45, for example. A plurality of combined alignment and releasable fastening means 46 are employed between adjacent pairs of modules to assure precise attachment of the modules together. Such means may comprise a pair of first and second L-shaped brackets 47 (FIG. 5) having their lower legs welded or otherwise suitably secured to plates 22 and 29, respectively, subsequent to the application of tack welds 45.

The upstanding legs of the brackets will thus abut each other in back-to-back relationship to align respective apertures 48 thereof. Each pair of aligned apertures are adapted to receive a fastener 49, such as a releasable nut and bolt. After the side, bottom and front modules have been attached together by fastening means 46, such fastening means, along with tack welds 45, are released and the truck body is disassembled into its modular units.

FINAL ASSEMBLY OPERATION

Upon such disassembly, the truck body is shipped to a customer's job site or the like, along with canopy module 20, four tie rod assemblies 50 and other miscellaneous hardware. At such job site, the modules are again positioned as shown in FIG. 3 and fastening means 46 are re-installed to fix the side, bottom and front modules in their precise positions. Simultaneously therewith, tie rod assemblies 50 are connected between side plates 21 of the side modules to further rigidify the assembled truck body during the subsequent welding operation.

Referring to FIG. 5, each end of each tie rod assembly has a threaded extension 51 secured thereon which extends through an opening 52, formed through a respective side plate, and receives a nut 53 thereon. An outer face 54 of the tie rod will abut an inner surface of the side plate to precisely set the predesigned distance between the inner surfaces of the side plates. Welds W, shown in dotted lines in FIGS. 5 and 6, are then applied between the seams defined between the outer ends of the bottom plate and the inner ends of the side plates.

As previously suggested in reference to FIGS. 2 and 6, the seam at a forward end of a truck body includes an overlapping of the adjacent ends of plates 22 and 29 at flange 28 to increase the structural integrity thereat.

The ends of U-shaped connecting members 55 and 56 are each locked mechanically in like-shaped recesses 27 and 32 (FIGS. 5 and 6) and welded to straddled rib 26 and beam 31. Members 56 each have a pair of cutouts 57 (one shown in FIG. 6) formed on lower edges thereof to accommodate raised flange portion 28 of bottom plate 22.

The front module is then welded in place in a manner similar to that described above. The integrated side, bottom and front modules are then inverted and the canopy module is suitably welded in place. The completed truck body is then mounted and attached on frame 12 by pivot means 15 (FIG. 1) and cylinders 16 are pivotally interconnected therebetween.

Although fastening means 46 preferably remain secured to the truck body during installation thereof on frame 12 of the truck (FIG. 1), tie rod assemblies 50 are preferably removed therefrom. Such removal may be accomplished by first removing nuts 53 from the ends of each tie rod assembly and by then cutting the tie rod assembly in half. Openings 52 may be suitably plugged subsequent to such removal, as indicated by the non-appearance of such openings in FIG. 1.

We claim:
1. A method for making a truck body comprising the steps of
   prefabricating a plurality of individual truck body modules,
   pre-assembling said modules together and retaining them in pre-aligned relationship relative to each other,
   securing combined alignment and releasable fastening means adjacent to edges of each respective pair of said modules,
   releasably attaching each respective pair of modules together by said combined alignment and releasable fastening means to form a truck body,
   releasing all of said fastening means to disassemble said truck body into said modules,
   shipping said modules to a remote location,
   re-assembling said modules together into said pre-aligned relationship,
   again attaching each respective pair of modules together by said combined alignment and releasable fastening means to re-form said truck body, and
   welding said modules together to form a structurally integrated truck body.

2. The method of claim 1 further comprising the step of mounting said integrated truck body on a frame of a vehicle subsequent to said welding step.

3. The method of claim 1 further comprising the step of tack welding said modules together prior to said securing step and subsequent to said pre-assembling step.

4. The method of claim 1 wherein said pre-assembling step comprises the step of inverting said modules.

5. The method of claim 1 further comprising the step of rigidifying said truck body by connecting a plurality of tie rods between said side modules subsequent to said shipping step.

6. The method of claim 1 further comprising the step of securing a canopy module on a forward end of said integrated truck body subsequent to said shipping step.

* * * * *